July 13, 1926.

M. C. HORINE

MOTOR VEHICLE

Filed May 16, 1924

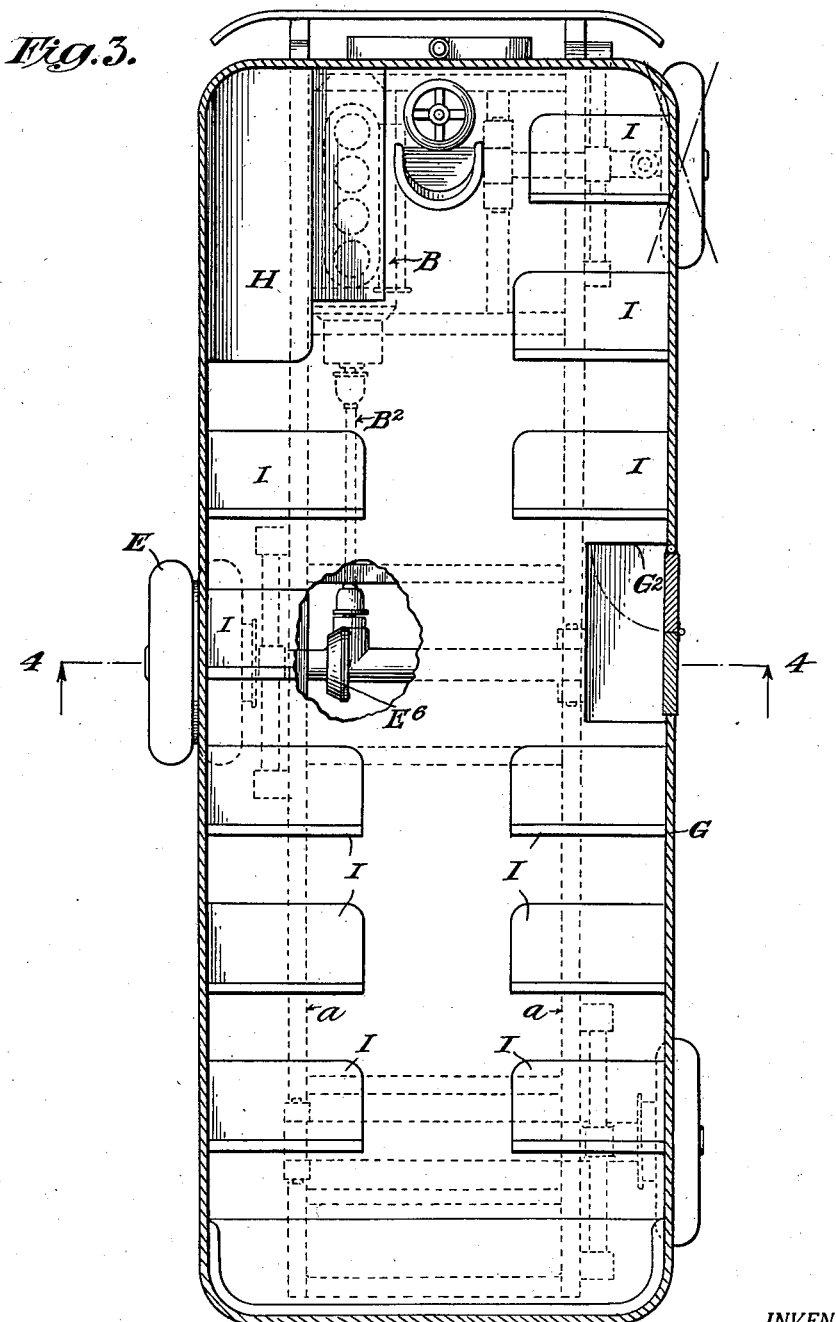

Patented July 13, 1926.

1,592,269

UNITED STATES PATENT OFFICE.

MERRILL C. HORINE, OF GRASMERE, NEW YORK, ASSIGNOR TO INTERNATIONAL MOTOR COMPANY, OF NEW YORK, N. Y., A CORPORATION OF DELAWARE.

MOTOR VEHICLE.

Application filed May 16, 1924. Serial No. 713,695.

This invention relates to motor vehicles and more especially to the low swung chassis of motor busses particularly designed for city use.

It is an object of the present invention to provide maximum stability in a vehicle of this character and one which will contribute to the comfort of the passengers both when riding therein and when entering and alighting from the same. Such stability is best attained by maintaining the center of gravity of the vehicle as low as possible. To this end the chassis frame and floor of the vehicle are supported as close to the ground as possible by dispensing with the front and rear axles as they are usually found in vehicles of this character and in lieu thereof supporting the entire weight of the vehicle upon a single wheel upon one side at the front end, a single wheel upon the same side but at the rear end thereof and a single wheel disposed between the aforementioned wheels but upon the opposite side of the vehicle. Such a construction permits easy entry into and exit from the body by means of a very low step disposed either at one end of the vehicle or midway between the ends thereof in the side of the body opposite to the wheel there disposed.

It is also an object of the invention to provide a simple and direct drive and an increased efficiency in the drive. The disposition of wheels lends itself to this end since, according to the invention, the middle wheel is used as the driving wheel thereby eliminating the use of a differential entirely and permitting greater concentration of weight over the driving wheel which carries at least half of the weight of the vehicle.

A further object of the invention is to facilitate the operation of the vehicle and increase the ease and safety with which it may be handled. Accordingly, the single wheel at the front of the vehicle serves as the steering wheel and the brakes are applied to the driving and rear wheels which together bear at least seventy-five percent of the total weight.

The invention also seeks to provide a construction which is capable of practical application to automotive transportation requirements and resides in the construction and arrangement of parts hereinafter described and illustrated.

The invention will now be described more fully with reference to the accompanying drawings illustrating preferred embodiments thereof and in which:

Figure 3 is a view in plan showing a modification of the invention wherein the motor is disposed forwardly and adjacent the driver's seat.

Figure 1:
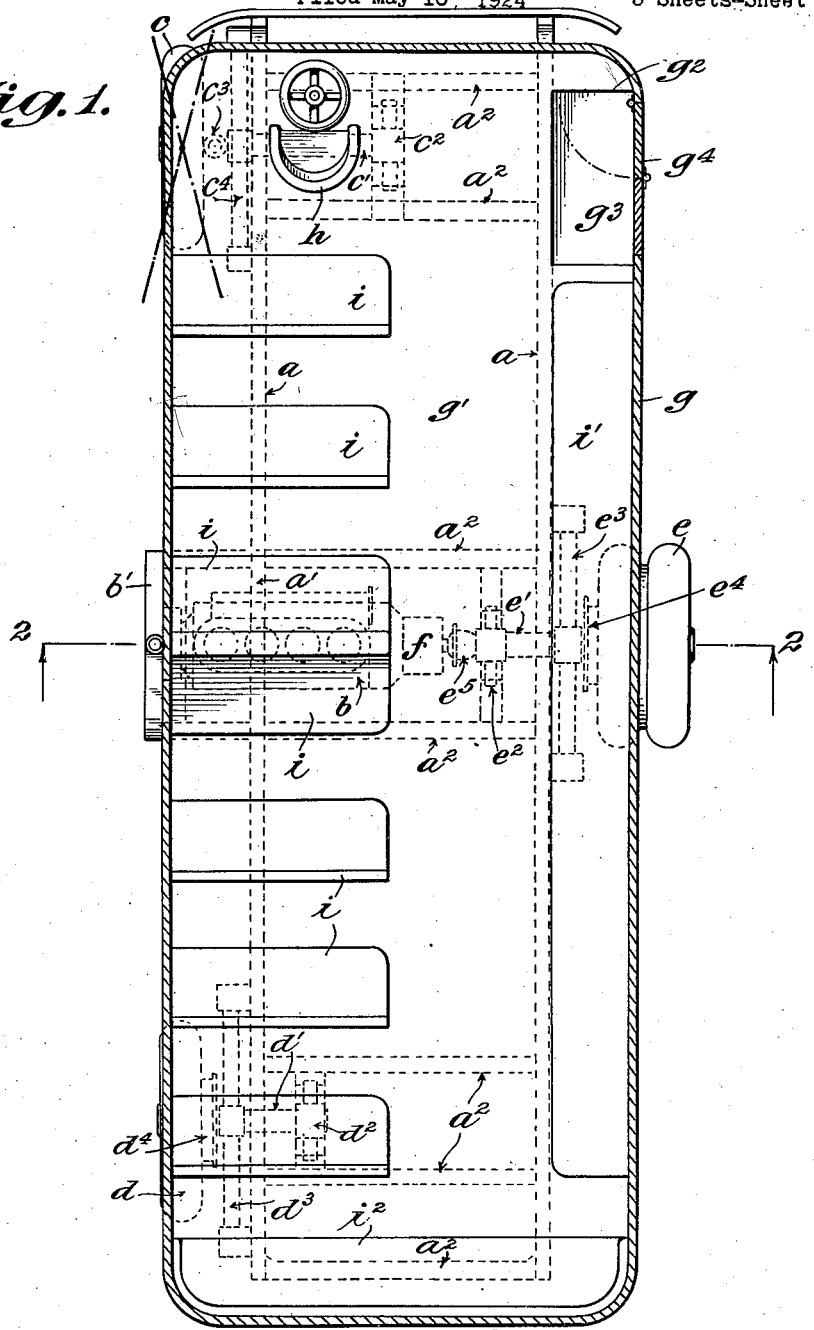
Figure 1 is a view showing in plan the invention as applied to motor busses.
Figure 2:
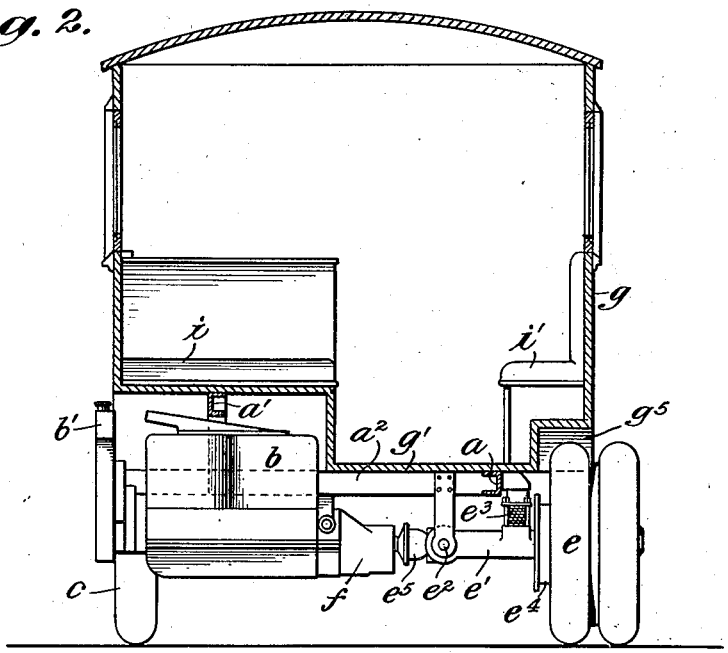
Figure 2 is a view in vertical section taken in the plane indicated by the line 2—2 in Figure 1 and looking in the direction of the arrows and showing the arrangement of the motor and driving wheels.

Referring to the modification disclosed in Figures 1 and 2 of the drawings, the chassis frame comprises the longitudinal side frame members $a$, $a$ offset in an upward direction at $a'$ whereby one may pass over the top of the motor $b$ and suitably braced throughout the length of the vehicle by cross members $a^2$. The frame may be constructed in a manner substantially similar to present day practice except that it may be very wide and is disposed considerably lower to the ground than is usually possible with frames supported by ordinary axles. In the present instance, such axles are dispensed with and in lieu thereof a single wheel $c$ is disposed at the front end upon one side of the vehicle upon the end of a stub axle $c'$ suitably journaled in the frame at $c^2$ and connected with the wheel spindle at its outer end by a conventional steering knuckle $c^3$. At its outer end the axle may support the frame through any form of springs shown in the illustrated embodiment as conventional semi-elliptic leaf springs $c^4$. Upon the same side of the vehicle and near the rear end thereof is a wheel $d$ carried with a stub axle $d'$ similarly journaled at its inner end with the vehicle frame as at $d^2$ and supporting the frame through the semi-elliptic leaf spring $d^3$. It is intended to apply braking power to the wheel $d$ and to this end a brake drum and associated parts is indicated at $d^4$ and is adapted to be actuated in any convenient manner. Between the ends of the vehicle and upon opposite sides thereof from the wheels before mentioned is disposed a driving wheel $e$. It is preferred that the wheel $e$ be disposed not exactly half way between the front and rear ends of the vehicle but slightly to the rear of such point from considerations of efficiency in drive and weight support. The wheel $e$ is carried upon a live axle section forming a stub shaft carried within a dead axle section $e'$ trunnioned to the frame at its inner end as at $e^2$ and supporting, at its outer end, the frame through the semi-elliptic springs $e^3$. Suitable braking mechanism is carried with the wheel $e$ as indicated at $e^4$ and is adapted, as is the brake mechanism $d^4$, to be actuated from the driver's seat. The live axle section within the stub shaft $e'$ terminates in a universal joint $e^5$ which couples the live axle with the tail shaft of the transmission gear set $f$ which in turn is disposed according to the usual practice in proximity to the engine $b$ and connected with the crank shaft thereof in the usual manner, the engine $b$ being disposed in the preferred embodiment transversely of the chassis frame and with its axis in the vertical plane of the axis of the stub shaft. A radiator of any convenient type may be disposed outwardly of the side of the vehicle body as indicated at $b'$.

A variation of the construction hereinbefore described with reference to the drive shaft is possible in which the stub axle is of the cranked type and carries a live jack shaft terminating in internal gears within the wheel hub or brake drum. In line with this stub axle the transmission may be set transversely at the left side of the frame directly at the side of the engine, also set transversely at the left side of the frame. Such a disposition of parts will also permit the engine to be equipped with a radiator at the side of the body and with a clutch and suitable drive from the clutch to the main shaft of the transmission gear-set by silent chain or similar means.

The driving wheel $e$ being the only wheel on the right side of the vehicle will support at least fifty percent of the weight of the bus because of its disposition with respect to the frame and will in addition support still more weight because of the crown of the road and because it is located in the preferred embodiment nearer the rear end than the front of the vehicle where more weight will be concentrated when the bus is carrying passengers. It may be equipped with tires of appropriate width as indicated in the drawings.

The chassis hereinbefore described is particularly applicable for use with motor busses and to this end may be equipped with a body as indicated at $g$, the floor $g'$ whereof rests directly upon the frame $a$. A seat for the driver is indicated in the forward end of the bus as at $h$ and at the forward end of the body in the side opposite the steering wheel $c$ is formed an entrance $g^2$ having a step $g^3$ and adapted to be closed by the sectional door $g^4$. It will be observed that the wheels of the vehicle are adapted to be disposed either wholly or in part within recesses $g^5$ formed in the body of the vehicle. When used as a bus the body may be either of the single or double decked variety, the seats on the lower deck being arranged in any convenient manner. In Figure 1 seats $i$ are shown as disposed transversely along one side of the vehicle with an isle nearer the right side of the vehicle whereby a passage over the driving axle is possible without necessitating a raised portion or step at this point, the engine $b$ which would normally project above the floor $g'$ being enclosed by seats arranged back to back. In a double deck bus it will be found convenient to locate the stairs to the upper deck at this point as an enclosure for the engine. Other seats such as the seats $i'$ and $i^2$ may be disposed along the right side and end of the vehicle if desired.

Figure 4:
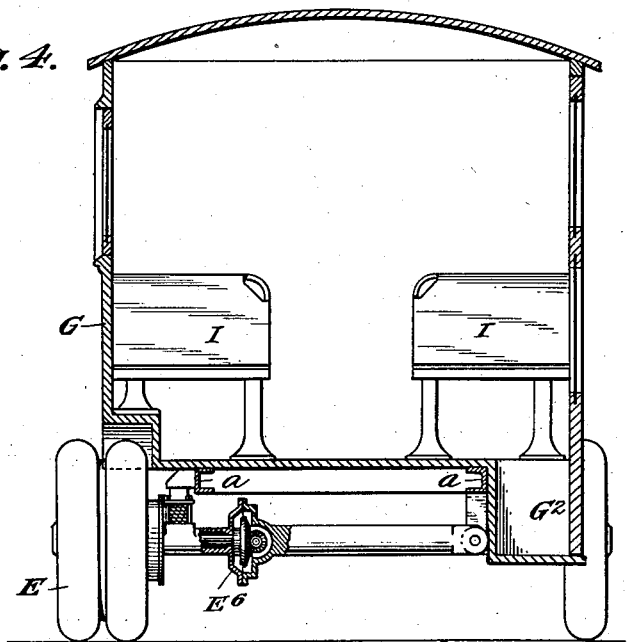
Figure 4 is a vertical sectional view taken in the plane indicated by the line 4—4 in Figure 3 and looking in the direction of the arrows.

The modification of the invention illustrated in Figures 3 and 4 is substantially similar to the construction just discussed. It will be observed, however, that in this construction the engine B is disposed forwardly of the chassis frame with its axis in the longitudinal direction of the vehicle. In this case the driving wheel E is disposed upon the left side of the vehicle and is adapted to be driven through beveled gears or the like contained within the housing $E^6$ into which the end of the propeller shaft $B^2$ extends. The entrance $G^2$ is disposed directly opposite the wheel E but is otherwise similar to the doorway hereinbefore described. In this modification the seats I are disposed transversely of the body G upon both sides of the vehicle while if the body is of the double deck type, the stairs H to the upper deck may be disposed above the engine B as an enclosure therefore.

It will thus be seen that a vehicle construction is provided which is particularly applicable for motor busses wherein convenient entry and exit is provided by means of a very low step while the riding qualities of the vehicle are enhanced due to the fact that the body is maintained close to the ground and supported upon only three wheels which present a three-point support on the road by which any unevenness thereof may be accommodated without subjecting the frame to any excessive weaving or twisting strains. The construction also permits a simple and direct drive since only one wheel is driven. Greater efficiency and compactness result from the absence of a differential and the absence of a longitudinal propeller shaft. It is easier to operate since only one wheel is required to be steered. Furthermore, the construction contributes to greater safety since increased braking is obtained by applying the brakes to the driving wheel and trailing wheel which together bear at least seventy-five percent of the total weight.

Various modifications may be made in the arrangement and distribution of the various component elements of the vehicle without departing from the spirit of the invention and no limitation is intended except as indicated in the appended claims.

What I claim is:

1. In a motor vehicle of the commercial passenger carrying type, in combination, a vehicle frame, a body supported thereon, a steering wheel disposed forwardly and at one side of said frame, a motor disposed upon the same side of the vehicle transversely of the frame and substantially midway between the ends thereof, a radiator disposed upon the outside of the body adjacent said motor, a transverse propeller shaft connected directly with said motor and extending to the opposite side of the frame, a driving wheel driven by said propeller shaft upon the opposite side of said frame and a trailing wheel disposed on the same side of the frame as the steering wheel, the steering wheel and trailing wheel being supported respectively by stub axles pivoted at one end on the chassis frame, and springs carried adjacent the other ends of the axles to support the chassis.

2. In a motor vehicle of the commercial passenger carrying type, in combination, a vehicle frame, a body supported thereon, wheels disposed at one side of said frame adjacent the front and rear ends thereof and a wheel disposed upon the opposite side of said frame substantially midway between the ends thereof and an entrance formed in the body in a side opposite one of said wheels.

This specification signed this 14th day of May A. D. 1924.

MERRILL C. HORINE.